March 6, 1951
M. V. KIEBERT, JR
FREQUENCY MODULATED RADIO-TYPE
DISTANCE MEASURING DEVICE
Filed May 26, 1945
2,543,782
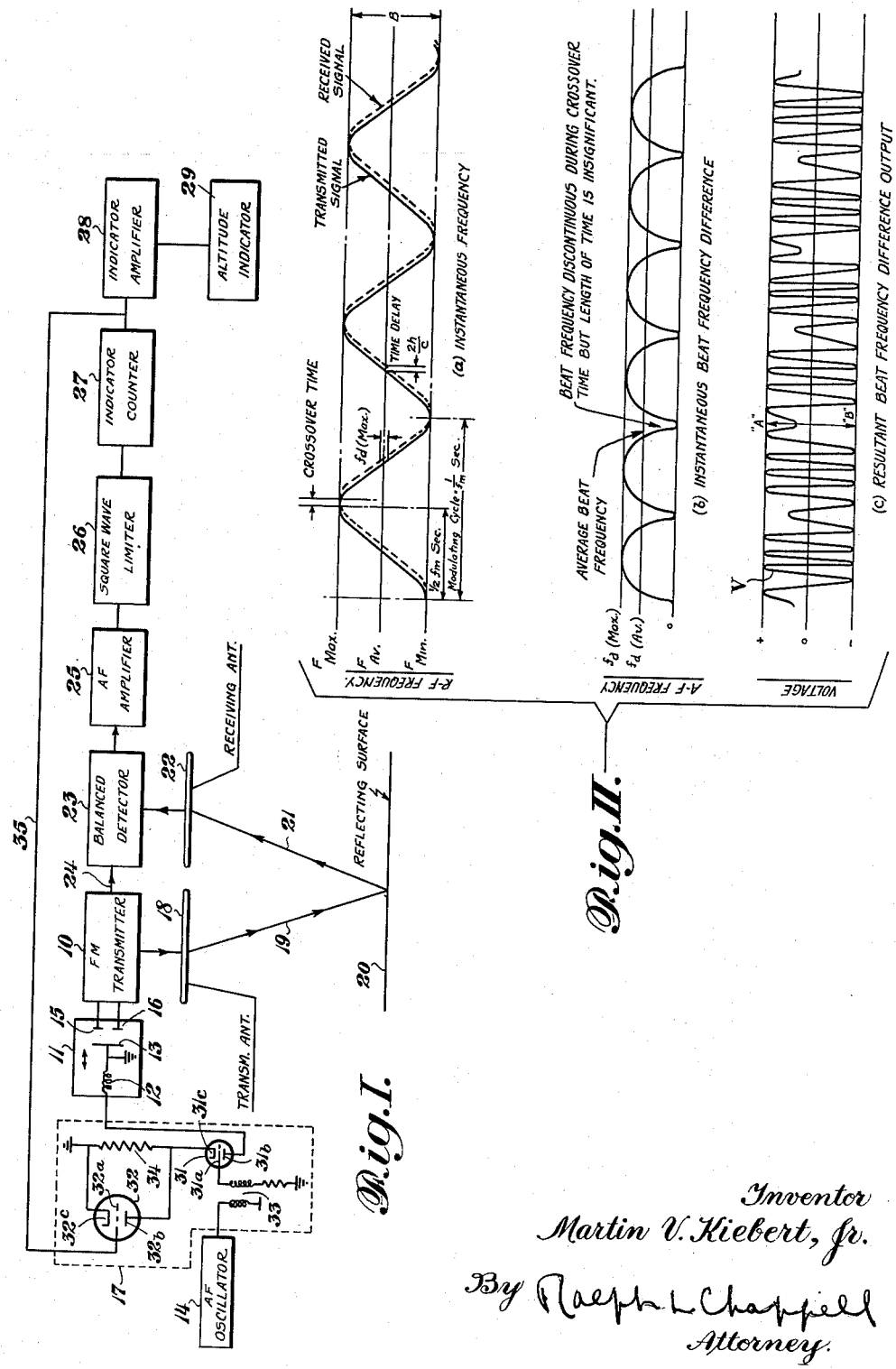
Inventor
Martin V. Kiebert, Jr.
By Ralph L Chappell
Attorney.

Patented Mar. 6, 1951

2,543,782

UNITED STATES PATENT OFFICE 2,543,782

FREQUENCY MODULATED RADIO-TYPE DISTANCE MEASURING DEVICE

Martin V. Kiebert, Jr., United States Navy

Application May 26, 1945, Serial No. 596,066

3 Claims. (Cl. 343—14)

(Granted under the act of March 3, 1883, as amended April 30, 1928; 370 O. G. 757)

This invention relates to apparatus for determining the distance between two objects such as the altitude of an aircraft from the ground and in particular to such apparatus of the radio type in which the distance is measured by transmitting a frequency modulated (FM) electromagnetic wave from the aircraft to the ground, receiving the reflected wave from the ground and determining the time interval between transmission and reception. Since the velocity of electromagnetic wave energy is a constant, the distance between aircraft and ground will obviously be a function of the time interval.

A general object of this invention is to provide an improved construction for an FM radio-type distance measuring device in which only a single scale indicator need be used to indicate distance accurately over a wide range.

A more specific object of this invention is to provide a frequency modulated (FM) radio-type distance measuring device in which the bandwidth of the frequency modulation imposed upon the carrier wave is compressed automatically as the distance is increased, as distinguished from present apparatus which utilizes a plurality of fixed FM bands, and in which the bands are switched from one to the other dependent upon distance. Thus, those components of the apparatus which follow the detector stage in my improved construction do not have to be changed to accommodate band switching; hence, a single scale distance indicator can be used to indicate distance accurately over a very wide range. This is accordingly a decided improvement over apparatus of present design in which a different scale must be provided in the distance indicating instrument for each of the bandwidths of frequency modulation used. That is to say, for example, if there are two bandwidths of frequency modulation employed to cover the complete distance range, the indicating instrument must have two scales of distance graduations, etc.

Still another object is to provide a distance measuring device of the class described in which the bandwidth of frequency modulation imposed upon the high frequency carrier wave is varied automatically as a function of the beat frequency between the transmitted and reflected waves.

A still further object is to provide a distance measuring device of the class described in which the bandwidth of the frequency modulation imposed upon the carrier wave is varied by changing the amplitude of the modulator unit associated with the high frequency oscillator component of the transmitter apparatus as a function of the beat frequency output of the detector stage of the apparatus.

In one type of apparatus of current design for measuring altitude, there is emitted, in a downward direction from a transmitter antenna, a radio-frequency carrier wave which is frequency modulated at a rate of 120 cycles per second between the approximate limits of 420 to 460 megacycles on the low range (0 to 400 feet) and 443 to 447 megacycles on the high range (400 to 4000 feet). The earth's surface reflects some of this carrier, and the reflected signal is received on a separate receiver antenna. During the time interval required for the signal to travel to earth and return to the aircraft, the transmitter frequency has, of course, changed. The combination of the reflected signal with a signal received directly from the transmitter results, by process of detection, in an audio-frequency signal, the average frequency of which is proportional to the altitude of the aircraft above ground. After passing through frequency counter circuits, the detected signal is used to operate a meter which is calibrated directly in feet of altitude.

If symmetrical "sawtooth" frequency modulation be assumed, it can be shown that when the instantaneous frequency of the transmitted signal is combined with the reflected signal, the beat frequency difference $f_d$ between the two signals may be computed from the equation $$f_d = 2f_m B \times 10^6 \left(\frac{2h}{C}\right) \text{ cycles per second}$$

where:

$f_m$ = modulator sweep frequency, in cycles per second;
$B$ = bandwidth, in megacycles ($F_{max} - F_{min}$);
$h$ = altitude, in feet (one-half the distance traveled by the radio wave); and
$C$ = velocity of propagation = $984 \times 10^6$ ft. per second.

Thus with a modulator frequency $f_m$ of 120 cycles, and with bandwidths of 460–420 or 40 megacycles on the low range, and 447–443 or 4 megacycles on the high range, the beat frequency difference per foot of altitude may be evaluated at approximately 19 cycles per second for the low range, and 1.9 cycles per second for the high range. At the maximum altitude of 400 feet on the low range and also 4000 feet on the high range, the beat frequency difference is approximately 7600 cycles per second.

If sinusoidal frequency modulation is assumed, the analysis differs from that given above for "sawtooth" or linear modulation in a few details. However, under normal operating conditions, the average beat frequency output for a given altitude will be equal to the constant beat frequency difference obtained when sawtooth modulation is used.

Up to the present time, it has been necessary to utilize two bandwidths on the carrier wave in order to produce an instrument which can be used over an acceptable range in altitude such as from zero to 4000 feet. The reason for this is that if accuracy is to be maintained, the detector must have a linear response over its entire range of operation. Furthermore, the signal to noise ratio must remain high throughout the beat frequency range so that the beat frequency counters will function accurately. Thus if a fixed bandwidth of 40 megacycles and a modulation frequency of 120 cycles per second be assumed, it is evident from the equation given above, that at an altitude of 4000 feet, the beat frequency difference would rise to 76,000 cycles; and at an extremely low altitude of, say 50 feet, the beat frequency difference would be only 950 cycles. The difficulties of designing such a wide band audio frequency detector and amplifier circuit which would retain a linear characteristic over so wide an audio range are obvious.

By use of a much lower bandwidth, the extremes of the beat frequency would be within such limits that an audio frequency detector and amplifier unit would retain a linear output characteristic. However, with apparatus of present design, the beat frequency difference output of the detector is amplified and passed through a square wave limiter stage before reaching the counter circuits in order to increase the accuracy of the counting function. The frequency counter circuits thus measure the average frequency of the square wave limiter output which may not be the exact average of the instantaneous beat frequency difference. The frequency of the limiter output actually varies with respect to the altitude in definite steps (multiples of the modulator frequency).

It can be shown that under flight conditions wherein the rate of change of altitude is very low, these frequency steps may be translated into steps of indicated altitude thus resulting in an inaccuracy which has become known as the "fixed error." The actual magnitude of this error is equal to $$\left(\frac{246}{B}\right)$$

where B is the bandwidth in megacycles.

Thus were a relatively low and fixed bandwidth such as 4 megacycles to be used, the "fixed error" would be equal to approximately 61 feet. The indicating instrument could thus not be relied upon to indicate altitude accurately in the lower altitude range. Furthermore, with a 4-megacycle bandwidth and a frequency modulation cycle of 120 cycles per second, the difference frequency $f_d$ per foot of altitude would be only 1.9 cycles per second. Hence, it would be most difficult because of the inherent signal-to-noise ratio in the audio frequency components of the apparatus to derive an output variable with $f_d$ from which altitudes in the lower range could be measured with any acceptable degree of accuracy.

So far, the answer to the problem has been to use the two-bandwidth system of the type described, a rather wide band being used for the lower altitude range and a rather narrow one being used for the upper altitude range. Two range scales in the distance indicator are accordingly required.

While the dual-range altitude indicating system described is, in itself, satisfactory, it is obviously imperative that the pilot remember at all times which range is in use. With the many other duties imposed upon the pilot, it is obviously quite possible for him to forget the particular range scale in use and often with fatal results.

The object of this invention, as previously stated, is to provide an improvement upon the presently designed apparatus to the end that a single scale instrument of wide range can be used, and it will give accurate results over its entire range of operation.

In the drawings,

Figure I is a block diagram which illustrates a preferred embodiment of the invention as applied to radio altimeter apparatus; and Figure II shows curves which explain diagrammatically the manner in which frequency modulation altimeters operate.

Referring now to Fig. I, a radio frequency signal is generated in transmitter unit 10. This signal is frequency modulated by a device 11 which includes a permanent magnetic field (not shown) and a moving coil 12 driving a metal diaphragm 13 which acts as the moving plate of a frequency modulator condenser. Diaphragm 13 is actuated by a nearly sinusoidal voltage supplied to the moving coil 12 by an audio frequency modulation generator 14 at a selected repetition rate, and moves relative to a pair of fixed condenser plates 15, 16. The amplitude of the output voltage from modulation generator 14 determines the maximum $F_{max}$ and minimum $F_{min}$ limits of modulation of the R. F. carrier signal generated in transmitter 10, and the period of this voltage determines the repetition rate or modulation cycle of carrier frequency modulation.

An electronic attenuator unit 17 is inserted in the line between modulation generator 14 and the frequency modulator device 11, and its function will be explained in more detail hereinafter.

The frequency modulated R. F. signal output from transmitter 10 is fed to a half-wave dipole antenna 18 carried by the aircraft and radiated therefrom in a downward direction along path 19 to the earth's surface 20. A portion of this radiated signal is reflected back along path 21 and returns to the aircraft, being received on antenna 22, which may also be a half-wave dipole. The relation between the transmitted and reflected signals is shown in Fig. II.

The reflected signal is fed into a detector 23 of the balanced type along with a signal direct from transmitter 10 over line 24. As previously explained, and with reference to Fig. II, direct injected and reflected waves will differ in frequency because of the fact that the frequency of the output from transmitter 10 has changed during the time $$\frac{2h}{C}$$

required for the wave energy to travel from the aircraft to the earth and be reflected back to the aircraft. The direct and reflected signals are then heterodyned in detector 23 to produce an output voltage V, which varies as the beat frequency difference $f_d$ between these two signals.

The output from detector 23 is then amplified in a multi-stage amplifier unit 25 and fed to a square wave limiter 26. The function of limiter 26 is to convert the output from amplifier 25 into substantially a square wave input signal to an indicator counter 27. Counter 27 develops a positive D. C. voltage which is approximately proportional to the frequency of the applied square wave limiter signal.

The output from counter 27 is fed to an indicator amplifier stage 28, the function of which is to supply a current proportional to the output from counter 27 to an altitude indicator meter 29.

Thus meter 29 may be calibrated in feet of altitude, since it has already been shown from the previously included equation that altitude is proportional to the instantaneous beat frequency difference $f_d$ between the frequency of the transmitted signal and the frequency of the reflected signal.

Assuming that the bandwidth B of the frequency modulated signal output from transmitter 10 remains fixed, the FM radio altimeter apparatus so far described excepting attenuator unit 17 is conventional. A somewhat similar system, from a basic point of view, is disclosed in U. S. Patent No. 2,206,903, issued July 9, 1940, to R. F. Lane et al.

However, as previously explained in the opening part of this specification, accurate indication of altitude over a comparatively wide range, say from 0 to 4000 feet, with a fixed bandwidth of frequency modulation of the carrier wave has not been possible with equipment of present design, and the solution so far has been to provide for two operating bandwidths—a wide band, for example 40 megacycles, for the lower range of altitude (0-400 feet), and a narrow band, for example 4 megacycles, for the higher range of altitude (400-4000 feet). The two bands are used selectively, and the pilot manually switches from one to the other depending upon the particular range of altitude at which he is flying. Of course, two different scales would then have to be used on indicator 29, and the pilot would always have to remember which scale was in use.

The object of this invention which is to so improve the presently designed apparatus that a single scale altitude indicator meter can be used, and which will measure altitude accurately over a very broad range, is attained by automatically compressing or reducing the bandwidth B of the frequency modulation of the high frequency carrier wave as a function of the increase in beat frequency difference $f_d$ between the transmitted and reflected signals.

In the preferred embodiment of the invention, I continually adjust the bandwidth B by taking an output from the indicator counter 27 which, as previously explained, is proportional to the beat frequency difference $f_d$ and utilize the same to control the previously mentioned attenuator 17.

Attenuator 17 includes a pair of tubes 31 and 32. The output from modulation generator 14 is applied through transformer coupling 33 to the grid 31a of tube 31. The anode 31b of this tube feeds moving coil 12 of the frequency modulation control unit 11. A resistor 34 is connected in circuit with the cathode 31c of tube 31 and across this resistor, the anode 32b and cathode 32c of tube 32 are connected. The grid 32a of of tube 32 is connected over line 35 to the output of indicator counter 27.

The arrangement is such that as the beat frequency difference $f_d$ increases, the positive voltage at the output of counter 27 likewise increases. This increase in voltage, which is then applied over line 35 to the grid 32a of tube 32, changes the voltage drop across resistor 34 and hence the bias on grid 31a of tube 31 in such a manner as to decrease the current flow in the anode-cathode circuit of this latter tube. Current flow through coil 12 is likewise decreased resulting in a decrease in amplitude of motion of the movable condenser plate 13. Since the bandwidth B of the frequency modulation applied to the carrier wave generated in transmitter 10 varies with the amplitude of motion of condenser plate 13, a decrease in this amplitude produces a decrease in bandwidth B. Conversely, an increase in current flow in the anode-cathode circuit of tube 31 caused by a decrease in beat frequency difference $f_d$ will effect an increase in bandwidth B.

The overall effect is that as the altitude is increased, the beat frequency difference $f_d$ will increase, notwithstanding the accompanying compression of the bandwidth B. However, because of bandwidth compression, $f_d$ increases much more slowly than in apparatus of present design and may be kept within such limits that detector 23 and the audio components which follow it in circuit will exhibit a linear characteristic throughout their entire operating ranges. Thus only one scale need be provided on the distance indicator 29, and since the output of the aforementioned components remain linear, the indicator will likewise register distance accurately throughout its entire operating range.

Furthermore, the "fixed error" in the altimeter apparatus will no longer be a constant quantity but will vary with the altitude to the desirable end that at the lower altitudes, the magnitude of the error will decrease to an inconsequential amount.

In conclusion, it is to be understood that while the embodiment described herein is preferred, various changes in the construction and arrangement of parts may be made without departing from the spirit and scope of the invention as defined in the appended claims. For example, the electronic attenuator 17 may be replaced with other types, the particular one utilized being determined largely by the particular design of the device used for frequency modulating the carrier wave, of which there are many.

The invention described herein may be manufactured and used by or for the Government of the United States of America for governmental purposes without the payment of any royalties thereon or therefor.

What is claimed is:

1. In an apparatus for measuring the distance between an object and a reflecting surface having a transmitter on said object for transmitting a high frequency radio carrier wave towards and for reflection from said surface, modulator means for cyclically varying the frequency of said carrier wave, and detector means combining the wave direct from said transmitter with the reflected wave to produce a beat frequency wave; a system for gradually compressing the band over which said carrier wave is modulated as the frequency of said beat frequency wave increases, said system comprising a control tube, an amplifier tube for providing an input signal to the modulator means, means coupled between the detector and said control tube for producing a potential proportional to the frequency of the beat frequency wave and for applying said potential to the grid of said control tube, the plate of which is connected to the cathode of said amplifier tube for varying the plate dynamic resistance of said amplifier tube so as to effectively change the current in the modulator means in accordance with the signal on the grid of said control tube, while maintaining variation of the plate current of said amplifier tube in accordance with the signal on the grid of said amplifier tube.

2. In an apparatus for measuring the distance between an object and a reflecting surface having a transmitter, a modulator for cyclically varying the frequency of the transmitted wave, and a detector for combining the transmitted and reflected waves to produce a beat frequency wave: a system for gradually compressing the band over which the transmitted wave is modulated as the beat frequency increases, said system comprising an amplifier tube for supplying an input signal to the modulator, a control tube having a grid, and means coupled between said detector and said control tube for producing a potential substantially proportional to the frequency of the beat frequency wave and for applying said potential to the grid of said control tube, the plate of said control tube being connected to the cathode of said amplifier tube so as to effectively change the current applied to the modulator in accordance with said potential, while maintaining variation of the plate current of said amplifier tube in accordance with the signal applied to the grid thereof.

3. In an apparatus for measuring the distance between an object and a reflecting surface having a transmitter, a modulator for cyclically varying the frequency of the transmitted wave, a detector for combining the transmitted and reflected waves to produce a beat frequency wave, and means for deriving a direct current potential substantially proportional to the frequency of the beat frequency wave: a system for gradually compressing the band over which the transmitted wave is modulated as the beat frequency increases, said system comprising a tube for supplying an input signal to the modulator, a control tube having a grid, and means coupled between the deriving means and said control tube for applying the direct current potential to said grid, the plate of said control tube being connected to the cathode of the first-mentioned tube for varying the plate dynamic resistance thereof so as to effectively change the current applied to the modulator in accordance with the potential, while maintaining variation of the plate current of said first-mentioned tube in accordance with the signal applied to the grid thereof.

MARTIN V. KIEBERT, Jr.

REFERENCES CITED

The following references are of record in the file of this patent:

UNITED STATES PATENTS

| Number | Name | Date |
| --- | --- | --- |
| 2,044,789 | Hefele | June 23, 1936 |
| 2,143,722 | Thomas | Jan. 10, 1939 |
| 2,206,903 | Lane et al. | July 9, 1940 |
| 2,232,858 | Lane | Feb. 25, 1941 |
| 2,257,830 | Wolff et al. | Oct. 7, 1941 |
| 2,280,109 | Varela | Apr. 21, 1942 |
| 2,321,269 | Artzt | June 8, 1943 |